(12) United States Patent
Atwan et al.

(10) Patent No.: US 9,761,884 B2
(45) Date of Patent: Sep. 12, 2017

(54) SYNTHESIS OF ALLOY NANOPARTICLES AS A STABLE CORE FOR CORE-SHELL ELECTROCATALYSTS

(71) Applicant: GM GLOBAL TECHNOLOGY OPERATIONS LLC, Detroit, MI (US)

(72) Inventors: Mohammed Atwan, Windsor (CA); Anusorn Kongkanand, Rochester Hills, MI (US); Michael K. Carpenter, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 14/309,293

(22) Filed: Jun. 19, 2014

(65) Prior Publication Data
US 2015/0372312 A1    Dec. 24, 2015

(51) Int. Cl.
*H01M 4/90*    (2006.01)
*H01M 4/88*    (2006.01)
(Continued)

(52) U.S. Cl.
CPC ......... *H01M 4/9041* (2013.01); *B22F 1/0018* (2013.01); *B22F 1/02* (2013.01);
(Continued)

(58) Field of Classification Search
None
See application file for complete search history.

(56) References Cited

U.S. PATENT DOCUMENTS 3,432,362 A * 3/1969 Kroll ................. H01M 4/90
                                                    429/499
2006/0257719 A1  11/2006 Merzougui et al.
(Continued)

FOREIGN PATENT DOCUMENTS

CN    101964424 A    2/2011
CN    103191757 A    7/2013

OTHER PUBLICATIONS

Zhang et al., Platinum monolayer on nonnoble metal-noble metal core-shell nanoparticle electrocatalysts for O2 reduction, Nov. 2005, J Phys Chem B, 109, 22701-22704.*

*Primary Examiner* — Daniel Gatewood
(74) *Attorney, Agent, or Firm* — Brooks Kushman P.C.

(57) ABSTRACT

A method for making tungsten-alloy nanoparticles that are useful for fuel cell applications includes a step of combining a solvent system and a surfactant to form a first mixture. A tungsten precursor is introduced into the first mixture to form a tungsten precursor suspension. The tungsten precursor suspension is heated to form tungsten nanoparticles. The tungsten nanoparticles are combined with carbon particles to form carbon-nanoparticle composite particles. The carbon-nanoparticle composite particles are combined with a metal salt to form carbon-nanoparticle composite particles with adhered metal salt, the metal salt including a metal other than tungsten. The third solvent system is then removed. A two-stage heat treatment is applied to the carbon-nanoparticle composite particles with adhered metal salt to form carbon supported tungsten-alloy nanoparticles. A method for making carbon supported tungsten alloys by reducing a tungsten salt and a metal salt is also provided.

21 Claims, 5 Drawing Sheets

(51) Int. Cl.
    *H01M 4/86* (2006.01)
    *B22F 1/00* (2006.01)
    *B22F 1/02* (2006.01)
    *B22F 9/24* (2006.01)
    *C22C 1/05* (2006.01)
    *C22C 26/00* (2006.01)

(52) U.S. Cl.
    CPC ............... *B22F 9/24* (2013.01); *C22C 1/058* (2013.01); *C22C 26/00* (2013.01); *H01M 4/8657* (2013.01); *H01M 4/9083* (2013.01); *C22C 2026/002* (2013.01)

(56) References Cited

U.S. PATENT DOCUMENTS

| | | | | |
|---|---|---|---|---|
| 2008/0171215 A1* | 7/2008 | Kumar | ................... | B22F 3/1017 |
| | | | | 428/546 |
| 2009/0305131 A1* | 12/2009 | Kumar | ................... | B22F 3/1146 |
| | | | | 429/206 |
| 2010/0105548 A1* | 4/2010 | Zhang | ..................... | B01J 23/892 |
| | | | | 502/313 |
| 2012/0046164 A1* | 2/2012 | Tanaka | ..................... | B01J 21/18 |
| | | | | 502/319 |
| 2014/0106261 A1 | 4/2014 | Kongkanand | | |

\* cited by examiner

SYNTHESIS OF ALLOY NANOPARTICLES AS A STABLE CORE FOR CORE-SHELL ELECTROCATALYSTS

TECHNICAL FIELD

In at least one aspect, the present invention is related to tungsten alloy compositions that are useful for fuel cell applications, and in particular, to tungsten alloy compositions coated with catalysts for use in fuel cell catalyst layers.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel and oxidant to disperse over the surface of the membrane facing the fuel- and oxidant-supply electrodes, respectively. Each electrode has finely divided catalyst particles (for example, platinum particles) supported on carbon particles to promote oxidation of hydrogen at the anode and reduction of oxygen at the cathode. Protons flow from the anode through the ionically conductive polymer membrane to the cathode where they combine with oxygen to form water which is discharged from the cell. The MEA is sandwiched between a pair of porous gas diffusion layers ("GDL") which, in turn, are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

Reducing the Pt loading and improving the ORR activity of the cathode catalyst has become one of the most difficult challenges on the road of commercializing the PEM fuel cell vehicle. Graphite particle supported core-shell electrocatalysts containing a continuous thin layer of Pt or Pt alloy shell overlaid on non-noble metal substrate particles can potentially overcome this critical challenge. A core-shell electrocatalyst concept where Pt is dispersed only on the surface of the nanoparticles is very promising due to its high activity and high dispersion of Pt. However, in a high temperature and highly acidic condition like those in a PEM fuel cell, choices of the core are very limited and often costly. Most less-costly candidates are either unstable or have poor adhesion to Pt resulting in poor Pt deposition. Although refractory metal alloys can potentially be good candidates, making these metal alloys into a nanoparticulate form is very challenging.

Pt ML/shell electrocatalysts' catalytic activities can be tuned by appropriate core/substrate. Pd and its alloys are still the best candidates as a substrate to support Pt ML/shell. Tungsten-M (M=Pd, Ni, Co, etc.) alloys have not been tested as stable core materials for Pt ML/shells. It has been reported in a theoretical study that the Pd dissolution potential in Pd/W system is higher than that of Pd(111), and even higher than the Pt dissolution potential. A strong binding energy between M and tungsten (W) should prevent M from being pulled up on to the top Pt ML/shell during the potential cycling and should lead to a higher oxygen reduction reaction (ORR) activity.

Accordingly, there is a need for an improved methodology for making core-shell electrocatalysts for fuel cell applications.

SUMMARY

The present invention solves one or more problems of the prior art by providing in at least one embodiment, a method for making carbon supported tungsten-alloy nanoparticles that are useful for fuel cell applications and in particular, for incorporation into a fuel cell electrocatalyst layer (e.g., anode or cathode catalyst layer). The method includes a step of combining a first solvent system and a surfactant to form a first mixture. A tungsten precursor is introduced into the first mixture to form a tungsten precursor suspension. The tungsten precursor suspension is heated to form tungsten nanoparticles. The tungsten nanoparticles are combined with carbon particles in an optional second solvent system to form carbon-nanoparticle composite particles. The carbon-nanoparticle composite particles are contacted with a metal salt in an optional third solvent system to form carbon-nanoparticle composite particles with adhered metal salt or product particles thereof, the metal salt including a metal other than tungsten. The carbon-nanoparticle composite particles with adhered metal salt or product particles thereof are collected. A two-stage heat treatment is applied to the carbon-nanoparticle composite particles with adhered metal salt or product particles thereof to form carbon supported tungsten-alloy nanoparticles. The two-stage heat treatment includes heating the carbon-nanoparticle composite particles with adhered metal salt or product particles thereof to a first heat treatment temperature under a first hydrogen-containing environment and then heating the carbon-nanoparticle composite particles with adhered metal salt or product particles thereof to a second heat treatment temperature under a second hydrogen-containing environment. Characteristically, the second heat treatment temperature is higher than the first heat treatment temperature and the first hydrogen-containing environment including hydrogen in a higher concentration than in the second hydrogen-containing environment.

In another embodiment, a method for making tungsten-nickel nanoparticles is provided. The method includes a step of combining a first solvent system and a surfactant to form a first mixture. $W(CO)_6$ is introduced into the first mixture to form a tungsten precursor suspension. The tungsten precursor suspension is heated to form tungsten nanoparticles. The tungsten nanoparticles are combined with carbon particles in an optional second solvent system to form carbon-nanoparticle composite particles. The carbon-nanoparticle composite particles are contacted with a nickel salt in an optional third solvent system to form carbon-nanoparticle composite particles with adhered nickel salt or product particles thereof. The carbon-nanoparticle composite particles with adhered nickel salt or product particles thereof are then collected. A two-stage heat treatment is applied to the carbon-nanoparticle composite particles with adhered nickel salt or product particles thereof to form carbon supported tungsten-nickel nanoparticles. The two-stage heat treatment includes heating the carbon-nanoparticle composite particles with adhered nickel salt or product particles thereof to a first heat treatment temperature under a first hydrogen-containing environment and then heating the carbon-nanoparticle composite particles with adhered nickel salt or product particles thereof to a second heat treatment temperature under a second hydrogen-containing environment. Characteristically, the second heat treatment temperature is higher than the first heat treatment temperature and the first hydrogen-containing environment includes hydrogen in a higher concentration than in the second hydrogen-containing environment.

In another embodiment, a method of making tungsten alloy particles is provided. The method includes a step of combining a tungsten salt, a metal salt of a metal other than tungsten, and a surfactant to form a reaction mixture. A reducing agent is added to the reaction mixture such to initiate a reduction reaction. Carbon particles are then added to the reaction mixture. Modified carbon particles are separated from the reaction mixture and then annealed under a hydrogen-containing environment to form carbon-tungsten alloy composite particles in which a tungsten alloy is dispersed over the carbon particles. Characteristically, the hydrogen-containing environment includes less than about 20 weight percent hydrogen gas with the balance being an inert gas.

In still another embodiment, a method of making tungsten alloy particles is provided. The method includes a step of combining a first solvent system and a surfactant to form a first mixture. A tungsten precursor is introduced into the first mixture to form a tungsten precursor suspension. The tungsten precursor suspension is heated to form tungsten nanoparticles. The tungsten nanoparticles are combined with a metal salt to form a second mixture. Carbon particles are added to the second mixture to form a third mixture. The particles produced are collected from the third mixture. A two-stage heat treatment is applied to the product particles to form carbon supported tungsten-alloy nanoparticles. The two-stage heat treatment includes heating the product particles to a first heat treatment temperature under a first hydrogen-containing environment and then heating the product particles to a second heat treatment temperature under a second hydrogen-containing environment. The second heat treatment temperature is higher than the first heat treatment temperature and the first hydrogen-containing environment includes hydrogen in a higher concentration than in the second hydrogen-containing environment.

Advantageously, stable cores such as WNi alloy nanoparticles prepared by the methods set forth above enable core-shell catalysts having high activity and high dispersion of Pt, hence increasing catalytic efficiency and lowering fuel cell cost. Moreover, the methods set forth above allows the manufacturing of catalysts in large quantities which is otherwise impossible with any of the prior art methods. The main goals to be achieved here are; to synthesize completely miscible tungsten-alloys to be used as stable cores for Pt ML/shell catalysts, and, hopefully, to alter the surface electronic structure for the benefit of enhancing the ORR activity.

DETAILED DESCRIPTION

Figure 1:
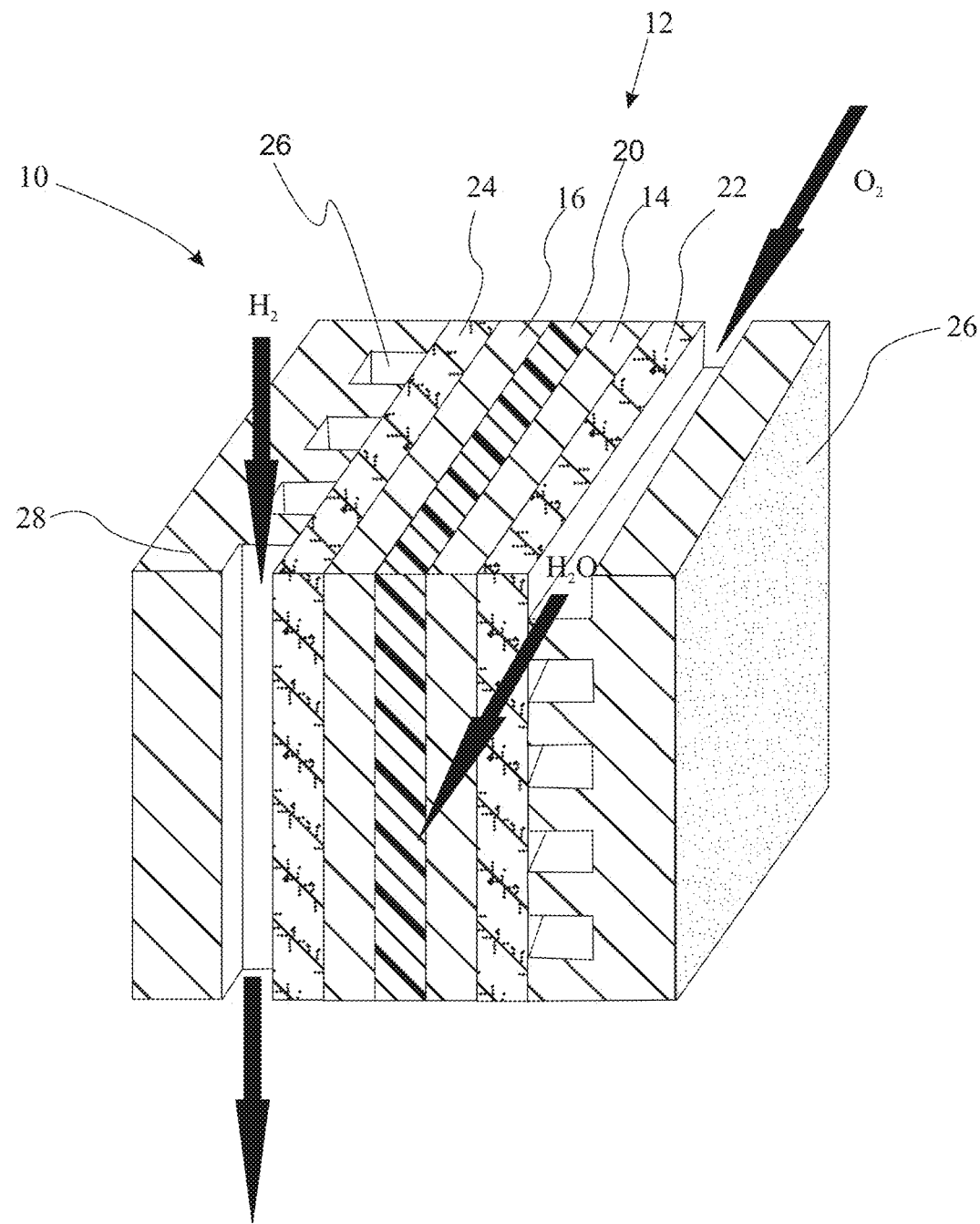
FIG. 1 is a cross sectional view of a fuel cell incorporating the carbon supported tungsten alloy nanoparticles of the present invention.

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Abbreviations:
Pt/ML means platinum monolayer.
"Acac" means acetylacetonate.
"M" means metal.

In an embodiment, the prefix "nano" means that the described particles have at least one spatial dimension from about 1 nanometer to about 100 nanometers. In a variation, the prefix "nano" means that the described particles have at least one spatial dimension from about 1 nanometers to about 20 nanometers. In another variation, the prefix "nano" means that the described particles have at least one spatial dimension from about 20 nanometers to about 50 nanometers.

With reference to FIG. 1, a cross sectional view of a fuel cell is provided. PEM fuel cell 20 includes polymeric ion conducting membrane 22 disposed between cathode electro-catalyst layer 24 and anode electro-catalyst layer 26. Fuel cell 20 also includes electrically conductive flow field plates 28, 30 which include gas channels 32 and 34. Flow field plates 28, 30 are either bipolar plates (illustrated) or unipolar plates (i.e., end plates). In a refinement, flow field plates 28, 30 are formed from a metal plate (e.g., stainless steel) optionally coated with a precious metal such as gold or platinum. In another refinement, flow field plates 28, 30 are formed from conducting polymers which also are optionally coated with a precious metal. Gas diffusion layers 36 and 38 are also interposed between flow field plates and a catalyst layer. As set forth below, cathode electro-catalyst layer 24 and anode electro-catalyst layer 26 include carbon supported tungsten-alloy nanoparticles coated with platinum made by the processes set forth below. Advantageously, these nanoparticles enhance the activity of the oxygen reduction reaction when incorporated into cathode electro-catalyst layers.

Figure 2:
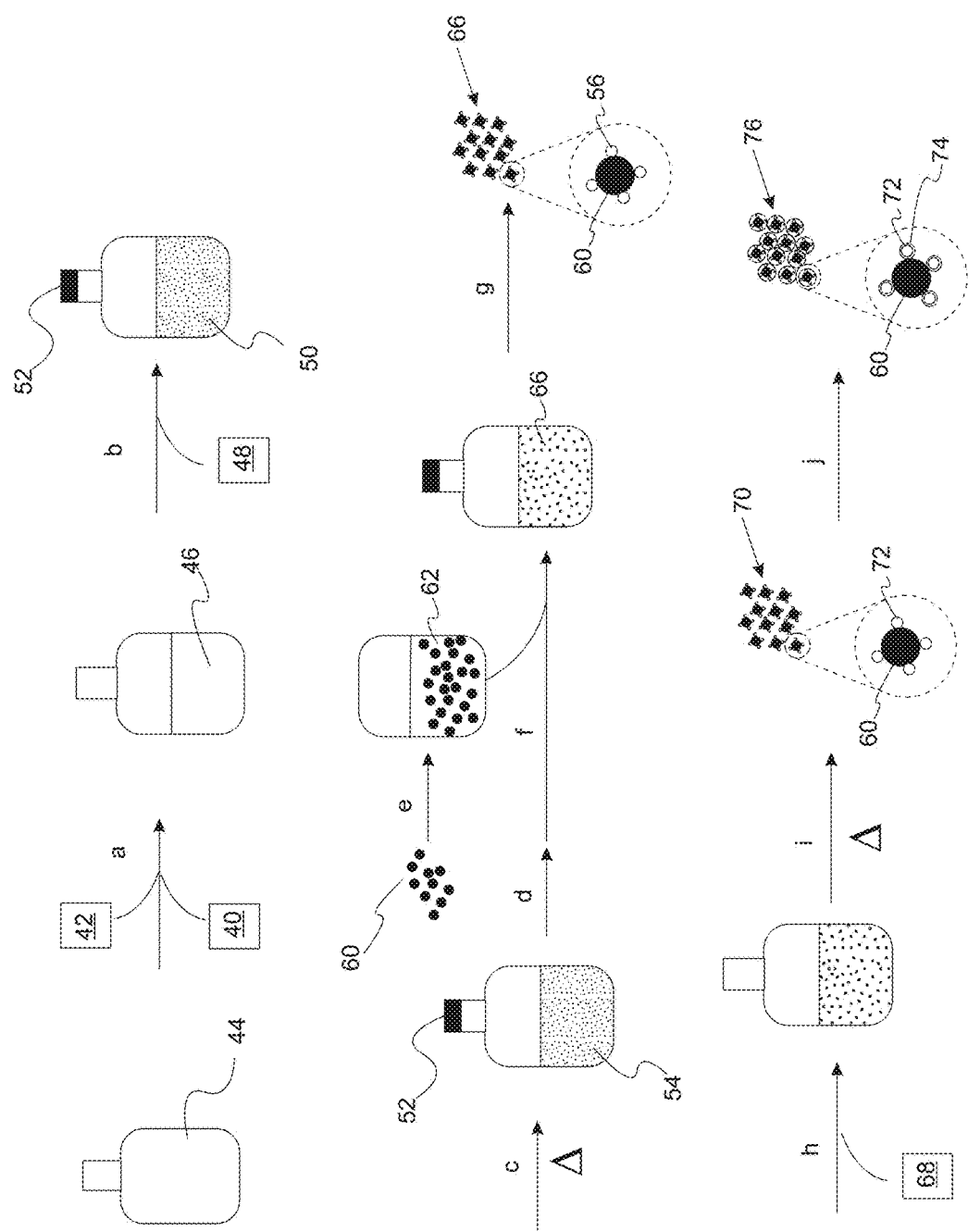
FIG. 2 provide a schematic flowchart illustrating a method for making an electrocatalyst for fuel cell applications.

With reference to FIG. 2, a method for tungsten alloy nanoparticles is schematically illustrated. Advantageously, the method of the present embodiment is capable of forming tungsten alloy nanoparticles having formula, W-M, supported on carbon particles where M is a metal other than tungsten. In particular, alloys of tungsten and virtually any metal capable of forming an alloy with tungsten are achieved by this method. Advantageously, the tungsten atoms are strongly adhered with the alloy metal M atoms so as to enhance durability and platinum catalytic activity. Specific alloying metals M include but are not limited to, nickel, iron, cobalt, copper, molybdenum, iridium, palladium, and combinations thereof. In step a), a first solvent system 40 and a surfactant 42 are combined in a reaction vessel 44 to form a first mixture 46. Examples of suitable surfactants include, but are not limited to, cetyltrimethylammonium bromide, (CTAB) oleylamine, oleic acid, and the like, and combinations thereof. Typically, the first solvent system includes at least one high boiling solvent with a boiling point greater than about 200° C. In a refinement, the high boiling solvent has a boiling point greater than or equal to, in increasing order of preference, 200° C., 220° C., 250° C., 260° C., 280° C., and 290° C. In another refinement, the first high boiling solvent has a boiling point less than about 350° C. A particularly useful high boiling solvent is dibenzyl ether which has boiling point of about 298° C. The first mixture is purged with an inert gas (e.g., nitrogen) to remove oxygen and water. The first mixture is typically heated to a temperature from 80 to 130° C. prior to introducing a tungsten precursor. In step b), a tungsten precursor 48 is introduced into the first mixture to form a tungsten precursor suspension 50 with the reaction vessel being closed at indicated by item number 52 so that volatile or sublimable tungsten precursors do not escape. In a refinement, the tungsten precursor is a compound in which the tungsten metal atom is in a zero oxidation state. An example of a particularly useful tungsten precursor is tungsten hexacarbonyl ($W(CO)_6$). The first mixture (or tungsten precursor suspension) is stirred to promote homogeneity while forming the tungsten precursor suspension. In step c), the tungsten precursor suspension 50 is heated to a temperature from about 200° C. to 300° C. to form a tungsten nanoparticle suspension 54 that includes tungsten-containing nanoparticles 56, and in particular, tungsten (metal) nanoparticles. The tungsten precursor suspension is maintained at this temperature for about 0.5 to 2 hours. Typically, the tungsten nanoparticles have an average spatial dimension (e.g., diameter) from about 1 to 15 nanometers. In another refinement, the tungsten nanoparticles have an average spatial dimension (e.g., diameter) from about 2 to 10 nanometers. In another refinement, the tungsten nanoparticles have an average spatial dimension (e.g., diameter) from about 2 to 6 nanometers. Typically, the tungsten precursor suspension is heated at a rate from about 5 to 20° C./min. Optimally, the tungsten precursor suspension is heated to about 250° C. at a rate of about 10° C./min. In step d), the tungsten nanoparticle suspension 54 is cooled to room temperature and then diluted with a second solvent system such as ethanol. The cooling typically takes about 45 minutes.

Still referring to FIG. 2, carbon particles 60 (i.e., a carbon powder) are dispersed in a solvent such as ethanol and agitated to form carbon particle dispersion 62 in step e). In one variation, the carbon particles are a carbon powder and in particular, a high surface area carbon (HSC) powder typically having an average spatial dimension (e.g., diameter) from about 10 to 100 nanometers. In a refinement, the carbon powder has an average spatial dimension from about 20 to 70 nanometers. In another refinement, carbon black having an average spatial dimension from about 10 to 100 nanometers is used for the carbon particles. A particularly, useful example of carbon black is Ketjen Black. In other variations, useful carbon particles have a variety of shapes. Examples of such shapes include, but are not limited to, powders, nano-rods, nanotubes, nano-rafts, non-electrically conducting particles, spherical particles, and the like. Nano-rods, nano-rafts, and nanotubes are each characterized by having at least one spatial dimension from about 10 nanometers to about 100 nanometers. With respect to dispersing the carbon powder in a solvent, sonication is found to be particularly useful for the carbon particles. In step f), the dispersion of carbon particles is then added to the tungsten nanoparticle suspension and mixed for an extended period of time (typically, 4 to 12 hours). In this step, tungsten nanoparticles 56 are impregnated into or adhered to the carbon particles 60 thereby forming a carbon-nanoparticle composite 66 of carbon particles and nano-sized tungsten alloy. In step g), the carbon-nanoparticle composite 66 is collected typically by filtration. The collected carbon-nanoparticle composite 66 is washed one or more times with a solvent such as ethanol. The solvent may be heated in order to present the crystallization of diphenyl ether. The collected carbon-nanoparticle composite is then dried for an extended period of time (e.g., 1 to 12 hours). In a refinement, the amount of tungsten loading is determined. Although any suitable technique may be used for this analysis, inductively coupled plasma mass spectrometry (ICP) is found to be particularly useful due to the ability of this technique to measure low amounts.

The amount of metal salt, MX, needed for the alloy formation is optionally calculated. M is the metal atom as set forth above and X is the counter ion such as halide (F⁻, Cl⁻, Br⁻, acac⁻, $NO_3^-$, and the like. In this regard, metal salts include compounds having the metal M is an oxidation state greater than 0 (e.g., +1, +2, +3, +4, +5, +6 and higher). The amount of metal salt is determined to result in tungsten alloys with a predetermined stoichiometry. In a refinement, the molar ratio of the tungsten precursor to the metal salt is 0.1:1 to 10:1. In another refinement, the molar ratio of the tungsten precursor to the metal salt is 1:1 to 5:1. Examples of metal salts include metal halides, metal acetylacetonates, metal nitrates, and the like. In particular, the metal salts include a component selected from the group consisting of nickel salts, iron salts, cobalt salts, copper salts, molybdenum salts, iridium salts, palladium salts, and combinations thereof. Specific examples of suitable nickel salts include, but are not limited to, $Ni(acac)_2$, $Ni(NO_3)_2$, $NiCl_2$, and the like. In step h), the carbon-nanoparticle composite 66 is then re-dispersed in a third solvent system and sonicated. The metal salt 68 is then introduced into the third solvent system so as to contact the carbon supported tungsten nanoparticles. In a refinement, the third solvent system includes a component selected from the group consisting of tetrahydrofuran, ethanol, water, toluene, xylenes (e.g., o-xylenes), and the like, and combinations thereof. Sonication is continued for a period of time typically until the solution becomes a paste containing tungsten alloy with adhered metal salt or product particles thereof. The paste is then heated under vacuum for an extended period of time (e.g., 1 to 12 hours).

The tungsten alloy with adhered metal salt or product particles thereof is then submitted to a two stage heating process in step i). In the first stage, the tungsten alloy is heat to a first heat treatment temperature under a high hydrogen environment. Typically, the first heat treatment temperature is from 350 to 500° C. In a refinement, the first heat treatment temperature is from 400 to 500° C. The high hydrogen-containing environment typically includes at least 10 weight percent hydrogen gas with the balance being an inert gas (e.g., nitrogen, helium, argon, etc.). In a further refinement, the high hydrogen-containing environment includes from 50 to 100 weight percent hydrogen gas with the balance being an inert gas. In the second heat treatment stage, the tungsten alloy with adhered metal salt or product particles thereof is heated to a second heat treatment temperature under a low hydrogen environment. The low hydrogen-containing environment typically includes less than about 15 weight percent hydrogen gas with the balance being an inert gas (e.g., nitrogen, helium, argon, etc.). In a further refinement, the low hydrogen-containing environment includes from 2 to 10 weight percent hydrogen gas with the balance being an inert gas. Typically, a hydrogen gas amount of about 5 weight percent is optimal. Typically, the first heat treatment temperature is higher than the second heat treatment temperature. In a refinement, the second heat treatment temperature is from about 500 to 800° C. In a refinement, the second heat treatment temperature is from about 650 to 750° C. The resulting tungsten-alloy nanoparticles typically have an average spatial dimension (e.g., diameter) from about 1 to 20 nanometers. In another refinement, the tungsten-alloy nanoparticles have an average spatial dimension (e.g., diameter) from about 2 to 10 nanometers. In another refinement, the tungsten-alloy nanoparticles have an average spatial dimension (e.g., diameter) from about 2 to 8 nanometers. In still another refinement, the tungsten-alloy nanoparticles have an average spatial dimension (e.g., diameter) from about 2 to 6 nanometers. In step j), the carbon supported tungsten-alloy nanoparticles 70 are collected. Tungsten-alloy nanoparticles 70 include tungsten alloy 72 disposed on carbon particles 60. In the tungsten alloy nanoparticles, the tungsten to metal molar ratios are typically from 0.1:1 to 10:1. In a refinement, the tungsten to metal molar ratios are from 1:1 to 5:1 in the tungsten alloy nanoparticles.

Still referring to FIG. 2, in a variation, carbon supported tungsten-alloy nanoparticles 70 are coated platinum layer 74 to form platinum coated particles 76 in step j. Typically, the platinum layer has a thickness from about 0.2 to about 1 nanometers. In another variation, other metals other than platinum, W, and M, may be coated in between the Pt and WM layer in order to improve adhesion or catalytic activity of Pt layer. This layer is typically a platinum-group metal such as palladium. The thickness of this layer is typically about 0.1 to 2 nanometers. In still another variation of the embodiment, the carbon supported tungsten-alloy nanoparticles coated with platinum are incorporated into a fuel cell electrocatalyst layer (i.e., anode catalyst layer or cathode catalyst layer). Typically, the carbon supported tungsten-alloy nanoparticles will be incorporated into an ink from which an electrocatalyst layer is formed (e.g. cathode layer). In a further refinement, the ink is printed onto the ion conducting polymeric membrane. U.S. Pat. Pub. No. 20060257719 provided methods for forming such inks with platinum loaded carbon powders which can be adapted for this purpose. The entire disclosure of this application is hereby incorporated by reference. Typically, the loading of the carbon supported tungsten-alloy nanoparticles is such that the platinum loading is from about 10 μgPt/cm² to about 400 μgPt/cm² in the electrocatalyst layers. In a refinement, the carbon supported tungsten-alloy nanoparticles are such that the platinum loading is from about 10 μgPt/cm² to about 100 μgPt/cm². In another refinement, carbon supported tungsten-alloy nanoparticles are such that the platinum loading is from about 10 μgPt/cm² to about 60 μgPt/cm². Finally, the electrocatalyst layer is then incorporated into fuel cell 20.

Detail for depositing platinum or platinum allow onto the tungsten nanoparticles is set forth in U.S. Pat. Pub. No. 20140106261; the entire disclosure of which is hereby incorporated by reference. In a refinement, platinum or platinum-alloy is deposited onto the tungsten nanoparticles by contacting the nanoparticles with a platinum precursor or a platinum alloy precursor. Examples of suitable platinum precursors include, but are not limited to, K2PtCl6, K2PtCl4, H2PtBr4, Pt(NO3)2, Pt acetylacetonate, and combinations thereof. Typically, the platinum or platinum-alloy precursor is reduced to metal with a chemical reductant or by solvent decomposition. This reduction is accomplished by selecting an appropriate reducing agent, surfactant, and reaction temperature. For example, after addition of platinum and/or platinum alloy-metal precursors to the LMPM-nanoparticle RTIL solution, hydrogen gas, CO gas, borohydride, or other reductants are used to reduce the metal on the core, with aid of tetrabutylammonium chloride (TBAC), cetyltrimethylammonium bromide, (CTAB) oleylamine, oleic acid or other surfactants as a stabilizer.

In another variation, platinum or platinum-alloy is deposited onto the tungsten alloy nanoparticles by Galvanic displacement of M nanoparticles with platinum. Galvanic displacement utilizes the differences in reduction potentials of various metals. In particular, a platinum precursor can be reduced using an easier-oxidizing metal such as Ni. As a result, platinum is reduced at the expense of Ni dissolution (oxidation) in what is essentially a battery reaction. In another variation, one can deposit another layer of metal other than Pt and WM in between the two layers to enhance adhesion, catalytic activity, or cost saving. For example, Pd can be deposited onto WM using galvanic displacement of M. Then Cu can be deposited onto Pd using a electrochemical process called underpotential deposition where only one monolayer of Cu is deposited on Pd. Last, Pt is deposited onto Pd using galvanic displacement as Cu is dissolved. In such manner, one can obtain a Pt/Pd/WM core-shell nanoparticles with only one monolayer of Pt.

In a variation, metal salt is combined with the tungsten prior to addition of the carbon dispersion formed in step e). In this variation, a first solvent system and a surfactant are combined to form a first mixture as set forth above. A tungsten precursor is introduced into the first mixture to form a tungsten precursor suspension. The tungsten precursor suspension is heated to form tungsten nanoparticles. The tungsten nanoparticles are combined with a metal salt to form a second mixture. Carbon particles are added to the second mixture to form a third mixture. The details of the tungsten precursor, the tungsten nanoparticles, the carbon particles, the first solvent system, and the metal salt are the same as set forth above. The produce particles are collected from the third mixture. A two stage heat treatment as set forth above is applied to the product particles to form carbon supported tungsten-alloy nanoparticles. The two stage heat treatment includes heating the product particles to a first heat treatment temperature under a first hydrogen-containing environment and then heating the product particles to a second heat treatment temperature under a second hydrogen-containing environment. The second heat treatment temperature is higher than the first heat treatment temperature and the first hydrogen-containing environment includes hydrogen in a higher concentration than in the second hydrogen-containing environment. The carbon supported tungsten-alloy nanoparticles are optionally coated with platinum and incorporated into fuel cell catalyst layers as set forth above.

Figure 3:
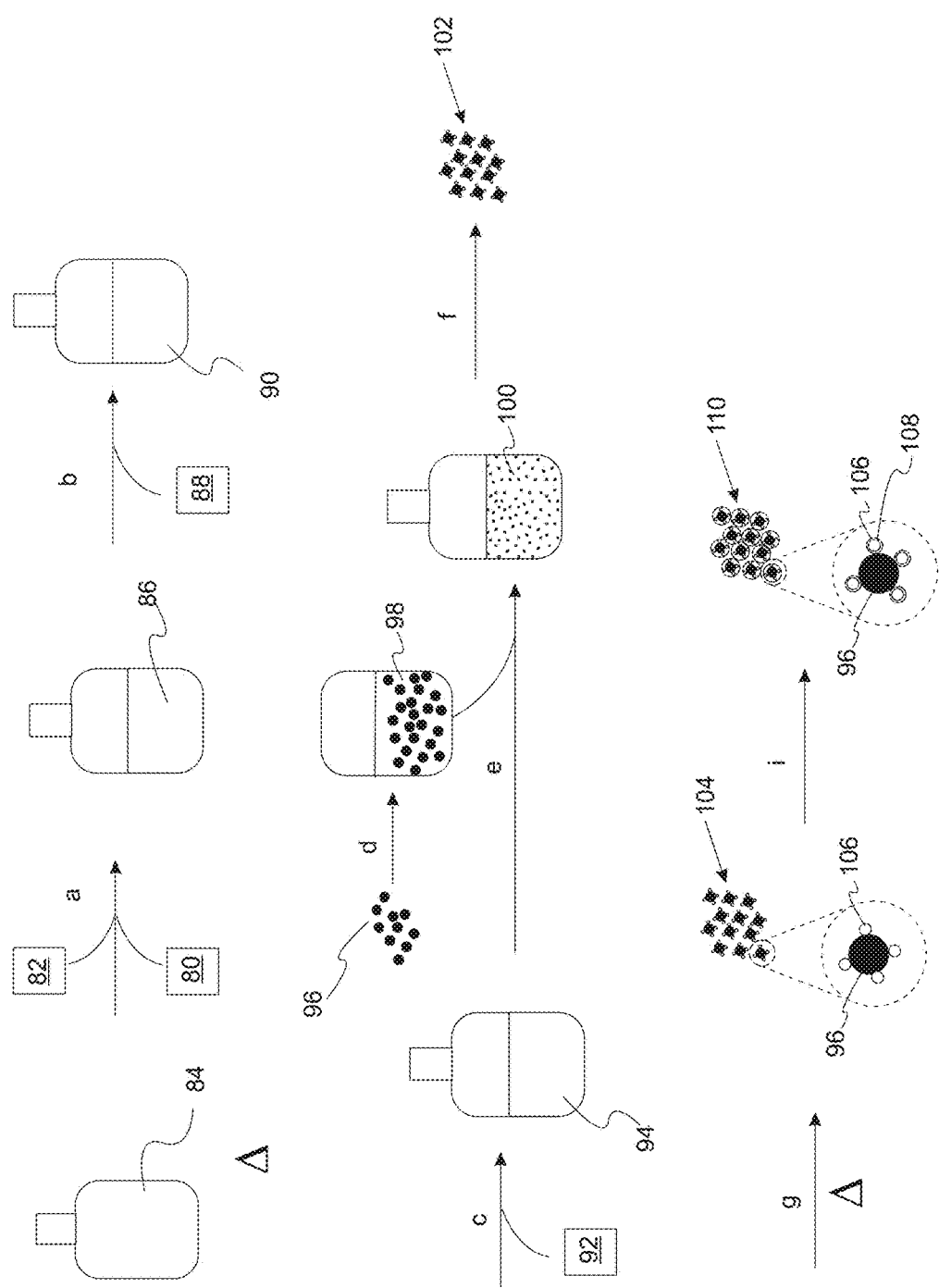
FIG. 3 provide a schematic flowchart illustrating a method using reduction of metal salts for making an electrocatalyst for fuel cell applications.

With reference to FIG. 3 a schematic illustration of a method using co-reduction of two metal salts is provided. In step a), a tungsten salt 80 is combined with a metal salt (MX) 82 of a metal other than tungsten in a first solvent system (e.g., THF) to form a first mixture 86 in reaction vessel 84. M is a metal other than tungsten and X is a counter ion such as halide ($F^-$, $Cl^-$, $Br^-$, $acac^-$, $NO_3^-$, and the like. In this regard, tungsten salts and/or metal salts include compounds having tungsten or metal M is an oxidation state greater than 0 (e.g., +1, +2, +3, +4, +5, +6 and higher). Specific examples of M include but are not limited to, nickel, iron, cobalt, copper, molybdenum, iridium, palladium, and combinations thereof. The relative amounts of the tungsten salt to the metal salt, MX, are set to provide the desired molar ratio in the tungsten alloy. In one refinement, the molar ratio of tungsten salt to metal salt is 0.1:1 to 10:1. In another refinement, the molar ratio of tungsten salt to metal salt is 1:1 to 5:1. In step b), a surfactant 88 such is then added to the first mixture to form second mixture 90. Examples of suitable surfactants include, but are not limited to, tetrabutylammonium chloride (TBAC), cetyltrimethylammonium bromide, (CTAB) oleylamine, oleic acid, and the like, and combinations thereof. TBAC is a preferred surfactant. Typically, the molar ratio of the combination of tungsten and metal salts to surfactant is 0.5 to 10.0 with 2:1 being optimal. The mixture is purged with an inert gas (e.g., $N_2$) under stirring. In step c), a reducing agent 92 is added after purging to form third mixture 94. An example of a suitable reducing agent is lithium triethylborohydride, sodium borohydride, and the like. The reaction continued under stirring for and addition 0.5 to 4 hours. In step d), carbon particles 96 are dispersed in a solvent (e.g., THF) to form carbon dispersion 98. In one variation, the carbon particles are a carbon powder and in particular, a high surface area carbon (HSC) powder typically having an average spatial dimension (e.g., diameter) from about 10 to 100 nanometers. In a refinement, the carbon powder has an average spatial dimension from about 20 to 70 nanometers. In another refinement, carbon black having an average spatial dimension from about 10 to 100 nanometers is used for the carbon particles. A particularly, useful example of carbon black is Ketjen Black. Sonication may be used for dispersing the solvent. In step e), the carbon particles added to the third reaction mixture 94 to form a fourth reaction mixture 100. The reaction is allowed to continue to stir for several hours (e.g., 2-5 hours). In step f), modified carbon particles 102 are collected by filtration and then washed. The modified carbon particles 102 are dried in a vacuum oven overnight. In step g), the product is then annealed under a hydrogen containing environment at an elevated temperature (e.g., 500 to 800° C.) for 0.5 to 4 hours to provide carbon-tungsten alloy composite particles 104 in which tungsten alloy 106 is disposed over and contacts the surface of carbon particles 96. In a refinement, the product is annealed at a temperature from 700 to 800° C. The hydrogen-containing environment typically includes less than about 20 weight percent hydrogen gas with the balance being an inert gas (e.g., nitrogen, helium, argon, etc.). In a refinement, the hydrogen-containing environment typically includes from about 5 weight percent to 15 weight percent (10 percent being optimal) hydrogen gas with the balance being an inert gas. In the tungsten alloy, the tungsten to metal molar ratios are typically from 0.1:1 to 10:1. In a refinement, the tungsten to metal molar ratios are from 1:1 to 5:1 in the tungsten alloy particles. The resulting tungsten-alloy nanoparticles typically have an average spatial dimension (e.g., diameter) from about 1 to 20 nanometers. In another refinement, the tungsten-alloy nanoparticles have an average spatial dimension (e.g., diameter) from about 2 to 10 nanometers. In another refinement, the tungsten-alloy nanoparticles have an average spatial dimension (e.g., diameter) from about 2 to 8 nanometers. In still another refinement, the tungsten-alloy nanoparticles have an average spatial dimension (e.g., diameter) from about 2 to 6 nanometers. In step j), the carbon supported tungsten-alloy nanoparticles 70 are collected. Tungsten-alloy nanoparticles 70 include tungsten alloy 72 disposed on carbon particles 60. In the tungsten alloy nanoparticles, the tungsten to metal molar ratios are typically from 0.1:1 to 10:1. In a refinement, the tungsten to metal molar ratios are from 1:1 to 5:1 in the tungsten alloy nanoparticles.

Still referring to FIG. 3, in a variation, carbon supported tungsten-alloy nanoparticles 102 are coated with a platinum layer 110 to form platinum coated particles 112 in step i). Typically, the platinum layer has a thickness from about 1 to about 10 nanometers. In another variation, the platinum layer has a thickness from about 2 to about 3 nanometers. In still another variation of the embodiment, the carbon supported tungsten-alloy nanoparticles coated with platinum are incorporated into a fuel cell electrocatalyst layer (i.e., anode catalyst layer or cathode catalyst layer). Typically, the carbon supported tungsten-alloy nanoparticles will be incorporated into an ink from which an electrocatalyst layer is formed (e.g. cathode layer). In a further refinement, the ink is printed onto the ion conducting polymeric membrane. U.S. Pat. Pub. No. 20060257719 provided methods for forming such inks with platinum loaded carbon powders which can be adapted for this purpose. The entire disclosure of this application is hereby incorporated by reference. Typically, the loading of the carbon supported tungsten-alloy nanoparticles is such that the platinum loading is from about 10 µgPt/cm$^2$ to about 400 µgPt/cm$^2$ in the electrocatalyst layers. In a refinement, the carbon supported tungsten-alloy nanoparticles are such that the platinum loading is from about 10 µgPt/cm$^2$ to about 100 µgPt/cm$^2$. In another refinement, carbon supported tungsten-alloy nanoparticles are such that the platinum loading is from about 10 µgPt/cm$^2$ to about 60 µgPt/cm$^2$. Finally, the electrocatalyst layer is then incorporated into fuel cell 20. Details of depositing platinum or platinum alloy onto the tungsten alloy nanoparticles is set forth above.

The following examples illustrate the various embodiments of the present invention. Those skilled in the art will recognize many variations that are within the spirit of the present invention and scope of the claims.

Figure 4:
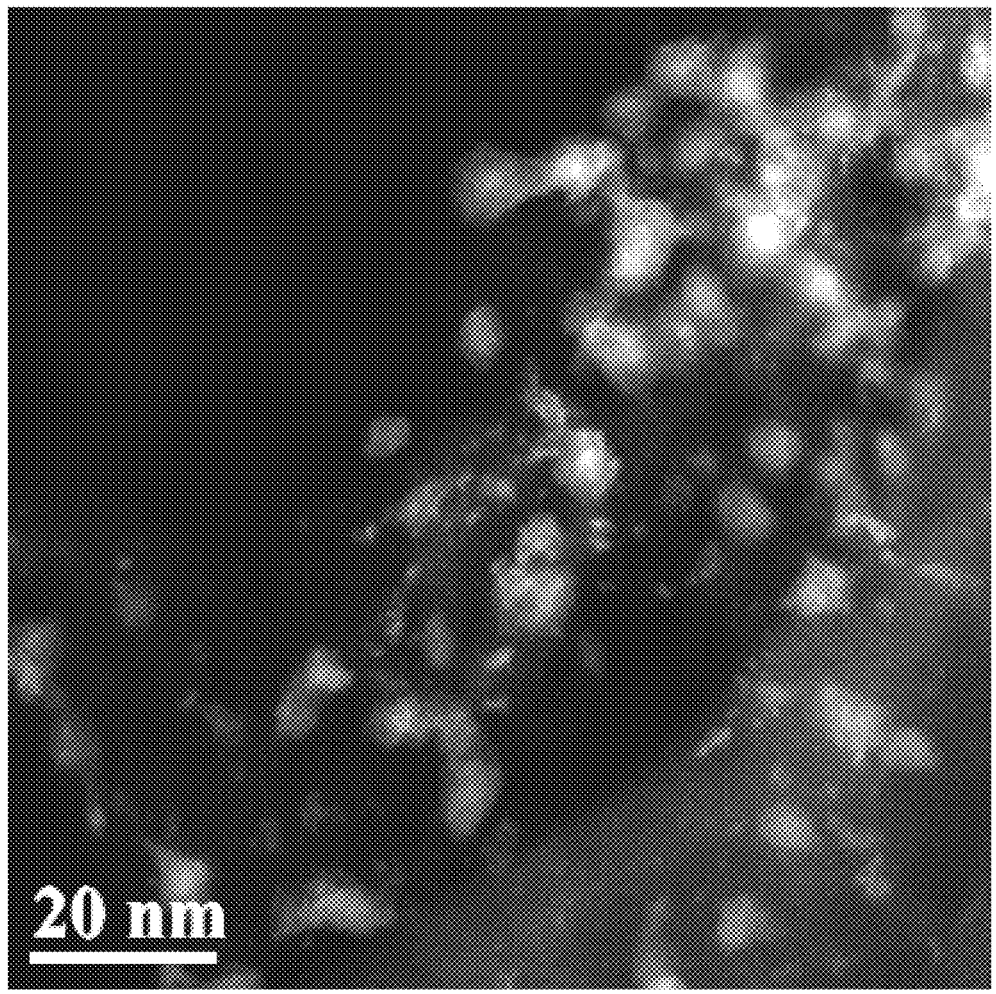
FIG. 4 provides a TEM image of synthesized WNi nanoparticles supported on graphite.
Figure 5:
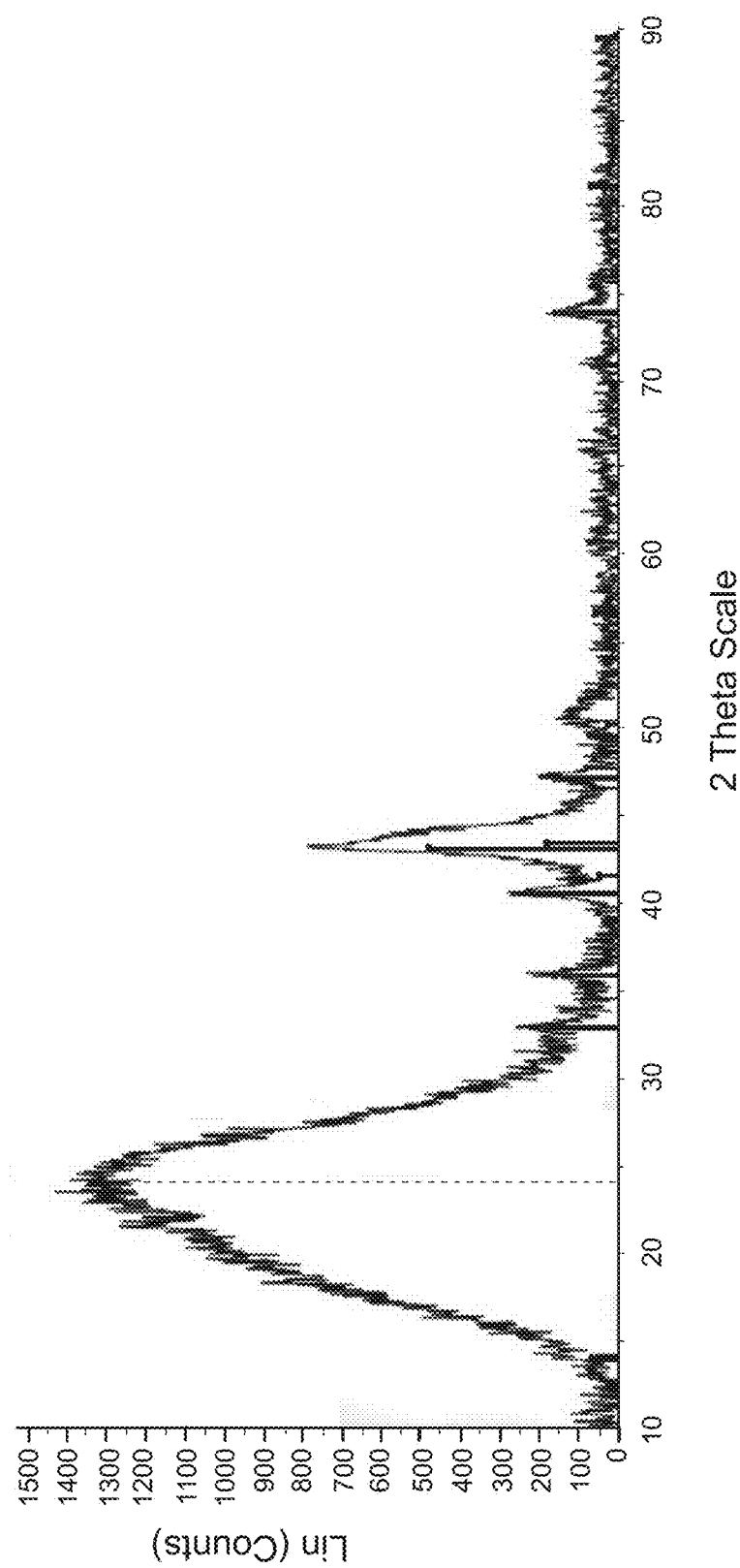
FIG. 5 provides a powder X-ray diffraction plot for tungsten nickel alloy supported on a carbon powder support.

A mixture of about 0.67 liters of diphenyl ether and 5.46 grams of CTAB is purged with $N_2$ for about 30 minutes. A closed vessel is used with a magnetic stirrer (do not use a condenser as $W(CO)_6$ easily sublimes). The mixture is heated to about 100° C. and then the tungsten precursor $W(CO)_6$ is added. The reaction vessel is closed and the nitrogen flow stopped. The temperature is raised to about 250° C. at a rate of about 10° C./min. The temperature is maintained at about 250° C. for 1 hour. The mixture is then cooled to room temperature (~45 min). About 1 liter of ethanol is then added. About 15 grams of E-type carbon are dispersed in 0.2 liters of ethanol by sonicating for 15 minute. The tungsten nanoparticle suspension is then added and stirred overnight. The resulting product is filtered and washed three times with ethanol. Since diphenyl ether may crystallize at room temperature warm ethanol or air blowing heater may be used to warm the ethanol. The collected product is dried in an oven at 40 C overnight. An 11 gram sample is collected for analysis and checked for tungsten loading with ICP. The requirement amount of the Ni-salt is calculated from this analysis. The carbon/tungsten nanoparticle product is re-dispersed in 100 ml of tetrahydrofuran (THF) with additional THF being added if the dispersion is poor. The carbon/tungsten nanoparticle product is sonicated for 15 minutes. The Ni-salt is dissolved in THF (~40 ml of THF) and then combined with the carbon/tungsten nanoparticle dispersion. The carbon/tungsten nanoparticle and Ni-salt combination is then sonicated at 40° C. until becoming a paste. The paste is then dried overnight under vacuum oven at 40° C. The resulting composition is then subjected to a two stage heat treatment protocol. In the first stage, the composition is heat to about 450 C under 100% $H_2$, for about 2 hours. In the second stage, the composition is heat at about 700 C under 5% H2, balance nitrogen for an additional 2 hours. FIG. 3 provide transmission electron micrographs of tungsten-nickel nanoparticles supported on carbon. The average particle dimension of the tungsten-nickel alloy is observed to be between 2 and 3 nanometers. Moreover, Z-contrast analysis reveals 95.89 atom percent carbon, 1.94 atom percent nickel, and 2.17 atom percent tungsten (i.e., 69.2 weight percent carbon, 6.85 weight percent nickel, and 23.95 weight percent tungsten). With respect to the alloy, the composition is 47.26 atom percent nickel and 52.74 atom percent tungsten (i.e., 22.25 weight percent nickel and 77.75 weight percent tungsten). FIG. 4 provides a TEM image of synthesized WNi nanoparticles supported on graphite. FIG. 5 provides powder X-ray micrograph revealing a single W—Ni phase on the carbon powder substrate.

A tungsten salt is combined with a nickel salt in THF to form a mixture. 71 mg of WCl4 and 500 mg of Ni(NO3)2 were added to the give a molar ratio of W to Ni of 1:4. A stoichiometric amount of tetrabutylammonium chloride is added to the mixture. The mixture is purged for 30 minutes under nitrogen under stirring. A lithium triethylborohydride solution is then added in a dropwise manner. The reaction is continued for 3 hours with continuing stirring. A carbon powder is dispersed into THF by sonication for 30 minutes. The ensuing mixture is kept under vacuum oven overnight and then annealed under 10% $H_2$, balance nitrogen at 750° C. for 1 hour. Transmission electron micrographs reveal 81.58 atom percent nickel and 18.52 atom percent tungsten (i.e., 58.57 weight percent nickel and 41.43 weight percent tungsten) for a 1:4.42 tungsten to nickel molar ratio. These values are confirmed by ICP.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for making tungsten-alloy nanoparticles comprising:
    a) combining a first solvent system and a surfactant to form a first mixture;
    b) introducing a tungsten precursor into the first mixture to form a tungsten precursor suspension;
    c) heating the tungsten precursor suspension to form tungsten nanoparticles;
    d) combining the tungsten nanoparticles with carbon particles in an optional second solvent system to form carbon-nanoparticle composite particles;
    e) contacting the carbon-nanoparticle composite particles with a metal salt in an optional third solvent system to form carbon-nanoparticle composite particles with adhered metal salt or product particles thereof, the metal salt including a metal other than tungsten;
    f) collecting carbon-nanoparticle composite particles with adhered metal salt or product particles thereof; and
    g) applying a two stage heat treatment to the carbon-nanoparticle composite particles with adhered metal salt or product particles thereof to form carbon supported tungsten-alloy nanoparticles, the two stage heat treatment including:
       heating the carbon-nanoparticle composite particles with adhered metal salt or product particles thereof to a first heat treatment temperature under a first hydrogen-containing environment; and
       heating the carbon-nanoparticle composite particles with adhered metal salt or product particles thereof to a second heat treatment temperature under a second hydrogen-containing environment, the second heat treatment temperature being higher than the first heat treatment temperature, the first hydrogen-containing environment including hydrogen in a higher concentration than in the second hydrogen-containing environment.

2. The method of claim 1 wherein the metal salt include a component selected from the group consisting of nickel salts, iron salts, cobalt salts, copper salts, molybdenum salts, iridium salts, palladium salts, and combinations thereof.

3. The method of claim 1 wherein the tungsten-alloy nanoparticles include a metal selected from the group consisting of nickel, iron, cobalt, copper, molybdenum, irridium, palladium, and combinations thereof.

4. The method of claim 1 wherein the tungsten-alloy nanoparticles include a tungsten nickel alloy.

5. The method of claim 1 wherein the tungsten-alloy nanoparticles have an average spatial dimension from about 1 to 10 nanometers.

6. The method of claim 1 wherein the first solvent system includes solvent with a boiling point greater than about 200° C.

7. The method of claim 1 wherein the carbon particles have an average spatial dimension from about 10 to 100 nanometers.

8. The method of claim 1 wherein the first solvent system includes dibenzyl ether.

9. The method of claim 1 wherein the surfactant is selected from the group consisting of cetyltrimethylammonium bromide, oleylamine, oleic acid, and combinations thereof.

10. The method of claim 1 wherein the tungsten precursor suspension is heated to a temperature from about 200° C. to 300° C. to form the carbon-nanoparticle composite particles.

11. The method of claim 1 wherein the first solvent system and the second solvent system each independently include a component selected from the group consisting of ethanol, tetrahydofuran, o-xylene, and combinations thereof.

12. The method of claim 1 wherein the first heat treatment temperature is from about 350° C. to 500° C. and the second heat treatment temperature is from about 500° C. to 800° C.

13. The method of claim 1 wherein the first hydrogen-containing environment includes from 10 to 100 weight percent hydrogen.

14. The method of claim 1 wherein the second hydrogen-containing environment includes less than 15 weight percent hydrogen.

15. The method of claim 1 further comprising coating the carbon supported tungsten-alloy nanoparticles with a 0.1 to 2 nanometer platinum layer.

16. A method for making tungsten-nickel nanoparticles comprising:
a) combining a first solvent system and a surfactant to form a first mixture, the first solvent system including a solvent having a boiling point greater than 200° C.;
b) introducing a $W(CO)_6$ into the first mixture to form a tungsten precursor suspension;
c) heating the tungsten precursor suspension to form tungsten nanoparticles;
d) combining the tungsten nanoparticles with carbon particles in an optional second solvent system to form carbon-nanoparticle composite particles;
e) contacting the carbon-nanoparticle composite particles with a nickel salt in an optional third solvent system to form carbon-nanoparticle composite particles with adhered nickel salt or product particles thereof;
f) collecting the carbon-nanoparticle composite particles with adhered nickel salt or product particles thereof; and
g) applying a two stage heat treatment to the carbon-nanoparticle composite particles with adhered nickel salt or product particles thereof to form carbon supported tungsten-nickel nanoparticles, the two stage heat treatment including:
heating the carbon-nanoparticle composite particles with adhered nickel salt or product particles thereof to a first heat treatment temperature under a first hydrogen-containing environment; and
heating the carbon-nanoparticle composite particles with adhered nickel salt or product particles thereof to a second heat treatment temperature under a second hydrogen-containing environment, the second heat treatment temperature being higher than the first heat treatment temperature, the first hydrogen-containing environment including hydrogen in a higher concentration than in the second hydrogen-containing environment.

17. The method of claim 16 wherein the tungsten-nickel nanoparticles have an average spatial dimension from about 1 to 10 nanometers.

18. The method of claim 16 wherein the first hydrogen-containing environment includes from 10 to 100 weight percent hydrogen.

19. Carbon supported tungsten-alloy nanoparticles comprising:
carbon particles having an average spatial dimension from about 10 to 100 nanometers; and
tungsten alloy nanoparticles supported on the carbon particles, the tungsten alloy nanoparticles having an average spatial dimension from about 1 to 10 nanometers.

20. The carbon supported tungsten-alloy nanoparticles of claim 19 comprising tungsten and a metal selected from the group consisting of nickel, iron, cobalt, copper, molybdenum, iridium, palladium, and combinations thereof.

21. A method for making tungsten-alloy nanoparticles comprising:
a) combining a first solvent system and a surfactant to form a first mixture;
b) introducing a tungsten precursor into the first mixture to form a tungsten precursor suspension;
c) heating the tungsten precursor suspension to form tungsten nanoparticles;
d) combining the tungsten nanoparticles with a metal salt to form a second mixture;
e) adding carbon particles to the second mixture to form a third mixture;
f) collecting product particles from the third mixture; and
g) applying a two stage heat treatment to the product particles to form carbon supported tungsten-alloy nanoparticles, the two stage heat treatment including:
heating the carbon-nanoparticle composite particles with adhered metal salt to a first heat treatment temperature under a first hydrogen-containing environment; and
heating the carbon-nanoparticle composite particles with adhered metal salt to a second heat treatment temperature under a second hydrogen-containing environment, the second heat treatment temperature being higher than the first heat treatment temperature, the first hydrogen-containing environment including hydrogen in a higher concentration than in the second hydrogen-containing environment.

* * * * *